United States Patent
Bardwil

(10) Patent No.: US 9,747,371 B2
(45) Date of Patent: Aug. 29, 2017

(54) METHOD AND SYSTEM FOR PRODUCING CUSTOMIZED CONTENT

(75) Inventor: Steve Bardwil, Westlake Village, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1179 days.

(21) Appl. No.: 12/287,973

(22) Filed: Oct. 14, 2008

(65) Prior Publication Data
US 2010/0094841 A1   Apr. 15, 2010

(51) Int. Cl.
*G06F 17/30* (2006.01)
*G06T 11/00* (2006.01)
*G06Q 10/10* (2012.01)

(52) U.S. Cl.
CPC .. *G06F 17/30843* (2013.01); *G06F 17/30578* (2013.01); *G06T 11/00* (2013.01); *G06F 17/30864* (2013.01); *G06F 17/30867* (2013.01); *G06Q 10/10* (2013.01)

(58) Field of Classification Search
None
See application file for complete search history.

(56) References Cited

U.S. PATENT DOCUMENTS

| | | |
|---|---|---|
| 5,903,317 A | 5/1999 | Sharir |
| 5,914,748 A | 6/1999 | Parulski |
| 7,046,732 B1 | 5/2006 | Slowe |
| 7,360,230 B1 | 4/2008 | Paz |
| 8,140,340 B2 * | 3/2012 | Bhogal et al. ............... 704/273 |
| 2003/0115220 A1 | 6/2003 | Chan |
| 2004/0133542 A1 * | 7/2004 | Doerksen et al. ............ 707/1 |
| 2006/0072815 A1 | 4/2006 | Wu |
| 2006/0174264 A1 * | 8/2006 | Candelore ..................... 725/34 |
| 2007/0220429 A1 | 9/2007 | Kureshy |
| 2008/0033804 A1 | 2/2008 | McKenna |
| 2008/0034314 A1 | 2/2008 | Louch |
| 2008/0098031 A1 | 4/2008 | Ducharme |
| 2008/0215973 A1 * | 9/2008 | Zalewski et al. ............ 715/706 |
| 2008/0285939 A1 | 11/2008 | Baum |
| 2009/0240736 A1 * | 9/2009 | Crist ........................ 707/104.1 |
| 2009/0276718 A1 * | 11/2009 | Dawson et al. ............. 715/753 |
| 2010/0241507 A1 * | 9/2010 | Quinn et al. .............. 705/14.42 |
| 2011/0234615 A1 | 9/2011 | Hanson |

* cited by examiner

Primary Examiner — Mark E Hershley
Assistant Examiner — Raheem Hoffler
(74) Attorney, Agent, or Firm — Farjami & Farjami LLP

(57) ABSTRACT

There is provided a method for producing a customized content, comprising identifying a customizable content from which to produce the customized content, identifying a base content in the customizable content, and receiving at least one customizing criterion as input. The method further comprises determining a plurality of content modifiers for harmonizing the base content and the customizing criterion, extracting the plurality of content modifiers from a modification library, and integrating the plurality of content modifiers with the base content to produce the customized content. In one embodiment, the method is embodied as instructions stored on a computer-readable medium. A system for producing customized content comprises a content host hosting a customizable content including a base content, a modification library, and a content customizing application.

23 Claims, 8 Drawing Sheets

METHOD AND SYSTEM FOR PRODUCING CUSTOMIZED CONTENT

BACKGROUND OF THE INVENTION

1. Field of the Invention

The present invention relates generally to the production of creative content. More particularly, the present invention relates to computer mediated customization of creative content.

2. Background Art

Much of the appeal of creative content, such as novels, film, television programming, and games, for example, flows from its ability to resonate with the individual life experience of the consumer. To have success in the marketplace in addition to being attractive to individual consumers, moreover, that appeal must be felt in common by the general population of potential consumers. Traditionally, the producers of content have had the luxury of a shared cultural perspective to rely upon when crafting content to be generally appealing. Common social mores, generally recognizable geographic locales, a collective memory of watershed historical events, and perhaps even more importantly, a largely shared consensus regarding interpretation of those events, have assisted content producers to connect with their audience in the past.

The general public to which a content producer must appeal today is a much larger and more polyglot group than that of the past, however. The breadth and diversity of today's public audience is attributable to many factors, two sets of which may be readily identified as having significant implications for potential producers of popular content. One of these is the combination of globalization and the telecommunications revolution of the last two decades, which together have produced a worldwide marketplace for content. As a result, it may no longer be enough for a content producer to provide content having regional or even national appeal. To be major players in the world market for consumer allegiance, content producers must now provide content having global appeal.

Paradoxically, the situation may be even more challenging for content producers targeting a more geographically, culturally and/or ethnically limited general audience. That is because although global market participants may have the resources to compete in the culturally complex and ethnically mixed world market, they may still lack the means to accommodate such diversity of experience and identity. Inconveniently for those content producers attempting to appeal to intra-national, regional, or even local markets, their constituent populations have grown more diverse as well. Thus, not only has the world become smaller as a whole, but local populations have grown less culturally and ethnically homogenous. Consequently, producers of creative content are faced with the challenge of providing content with which a highly diverse audience can at once identify with and connect to.

One conventional approach to meeting the challenges described may be termed the brute force approach, wherein content is produced in multiple distinct versions targeting different groups. The disadvantages associated with that conventional approach include the expense and inefficiency of producing multiple versions of the same fundamental content. In addition, there may be substantial logistical costs associated with generating accurate projections of how much content to produce in which version, as well as timely and effective distribution of the appropriate content version to its target audience. These disadvantages, while significant, may be less acute for large producers of content equipped to compete in a global marketplace than for smaller producers targeting national or regional markets, for which they may present insurmountable obstacles.

Another conventional approach to making content more generally appealing to a broader, more diverse, audience is purposeful genericide of the content. In that approach, content is created around universal human themes, and largely decoupled from any specific cultural context. Those universal human themes are then brought to life and play themselves out in an environment that is intentionally devoid of cultural symbolism. Animation, for example, may lend itself particularly well to such content genericide, even to the point that characters may be rendered only humanlike, rather than fully simulating human beings, so that their physical features and expressions defy identification with any one race or ethnicity.

An obvious disadvantage of this latter approach is that it requires a great deal of skill to strike a balance between appealing cultural neutrality and social irrelevance. Moreover, this approach requires the consumer to assume much of the work of interpreting the content, imposing on them the burden of discovering and appreciating the universally themed message, while failing to provide the culturally specific social cues often relied upon to guide intuition.

Accordingly, there is a need to overcome the drawbacks and deficiencies in the art by providing a solution enabling a producer, a distributor and/or an individual consumer to customize creative content so as to render that content relevant to individual life experiences, geography, cultural heritage, ethnicity, iconography, symbolism and the like, regardless of the area of the world in which an audience resides, or the particular cultural or ethnic heritage of the audience.

SUMMARY OF THE INVENTION

There are provided methods and systems for producing customized content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
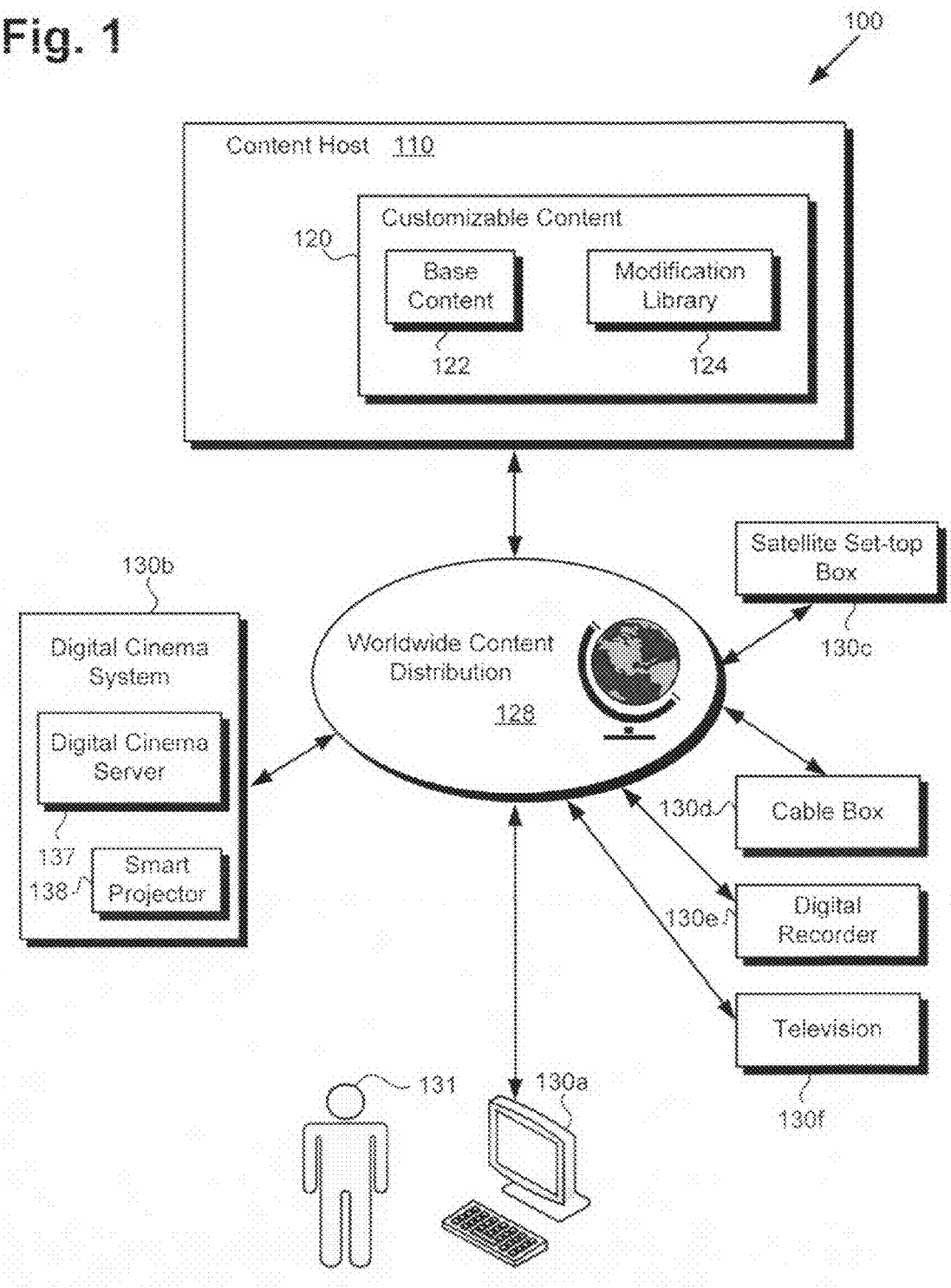
FIG. 1 is a high level diagram showing worldwide distribution of customized content produced according to an embodiment of the present invention.

The present application is directed to a method and system for producing customized content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a high level diagram showing worldwide distribution of customized content produced according to an embodiment of the present invention. In the embodiment of FIG. 1, system 100 comprises customizable content 120 including base content 122 and modification library 124, residing on content host 110. Also represented by system 100 is worldwide content distribution hub 128, enabling delivery of customizable content 120, to a variety of example content clients 130a through 130f, each of which may be accessible to a consumer, such as consumer 131. As shown in FIG. 1, the variety of example content clients includes personal computer (PC) 130a, digital cinema system 130b including digital cinema server 137 and smart projector 137, satellite set-top box 130c, cable box 130d, digital recorder 130e, and television (TV) 13f.

According to the embodiment of FIG. 1, a content administrator of customizable content 120, who may be, for example, a producer of the customizable content, or a distributor or consumer of the content, may utilize one or more of content clients 130a through 130f to produce customized content from customizable content 120. As shown in FIG. 1, customizable content 120 includes modification library 124 and base content 122 which may itself be a presentation-ready content capable of playback without customization. In that embodiment, the content administrator may use a content customizing application (not shown in FIG. 1) to identify customization rules coded into customizable content 120, and determine the content modifiers necessary to produce customized content from the base content, according to customization criteria associated with a target audience for the customized content.

In the manner described above, a producer, director, distributor, consumer 131, or other party may customize the base content to produce customized content having customized presentation features including cultural, geographical, ethnic, architectural, iconographical, and physiological features, for example, familiar to a particular audience including consumer 131. As a result, consumer 131 may be able to more closely relate to and connect with the content, making the content more desirable and/or engaging to the consumer. As a specific example illustrative of the foregoing, consider consumer 131 being a resident of India, and customizable content 120 comprising a feature film shot on location in a small town in the Midwestern United States. Customizable content 120 might include base content 122 corresponding to a version of the feature film produced for a default American audience, for example, that is a self contained, presentation-ready content capable of playback without customization, in the default format.

Playback of base content 122 without customization would provide a presentation reflective of the culture of the default audience. Consumer 131, residing in India, may wish to view the presentation in its default format, in which case customization would not be necessary. However, consumer 131 acting as customization administrator, has the option of customizing customizable content 120 to produce customized content, by integrating base content 122 with content modifiers drawn from modification library 124. Those content modifiers may represent cultural symbols, signage, coloring, weather, geography, architecture, and/or physiological features familiar to the people in India.

Alternatively, customizable content 120 may be customized by the producers of the content acting as customization administrators, and be made available as pre-customized content directly from content host 110. Or, as yet another exemplary option, customizable content 120 may be customized by content distributors acting as customization administrators, such as one or more managers of content clients 130a through 130f, prior to presentation of the customized content to an audience including consumer 131. Thus, the customization processes may be directed by a director or producer, including a director or producer of the base content, by a distributor, by the viewing customer, or by a combination of any of these people working alone or cooperatively, and may occur at any point in the distribution network. The customization processes may be directed by human input or may operate substantially automatically by applying pre-established customization processes and rules.

In one embodiment, for example, system 100 may be configured to produce customized content having customized presentation features corresponding to a geographical region associated with consumer 131, which may be India, or another geographical region selected by the customization administrator. In one embodiment, integration of the content modifiers with the base content results in altering the physical appearance of human-like figures included in the base content, for example by changing the eye, hair, and/or skin color of images of human characters included in the content.

In a similar manner, other consumers residing in Japan, Iceland, or Kenya, for example, may be exposed to the base content of customizable content 120 in its default format, or enjoy a customized content reflective of their respective cultures and environments, depending on selections made by customization administrators corresponding to those various consumption experiences. Because customization may be performed by a customization administrator at one or more levels of a distribution chain, a broad spectrum of cultural sensibilities can be accommodated, enabling consumers to enjoy the content in a culturally appropriate format. Although the previous example specified customizable content 120 as comprising a feature film, in other embodiments customizable content 120 may include base content selected from a wide variety of entertainment or information content, such as electronic books, instructional materials, film, TV, video games, music videos, and advertisements, for example.

Furthermore, although specific mention was made in the previous example of content modifiers comprising cultural symbols, and geographic, architectural, and physiological features, a host of other features of the content may be alterable through use of content modifiers as well. For example, the language in which the base content is presented, the music or other audio features accompanying the base content, and/or the attire of characters represented in the base content may be modified to reflect geographic or regional norms. In addition, even more subtle issues such as culturally specific standards of modesty, or the use of sacred or profane references may be addressed by content modifiers.

Figure 2:
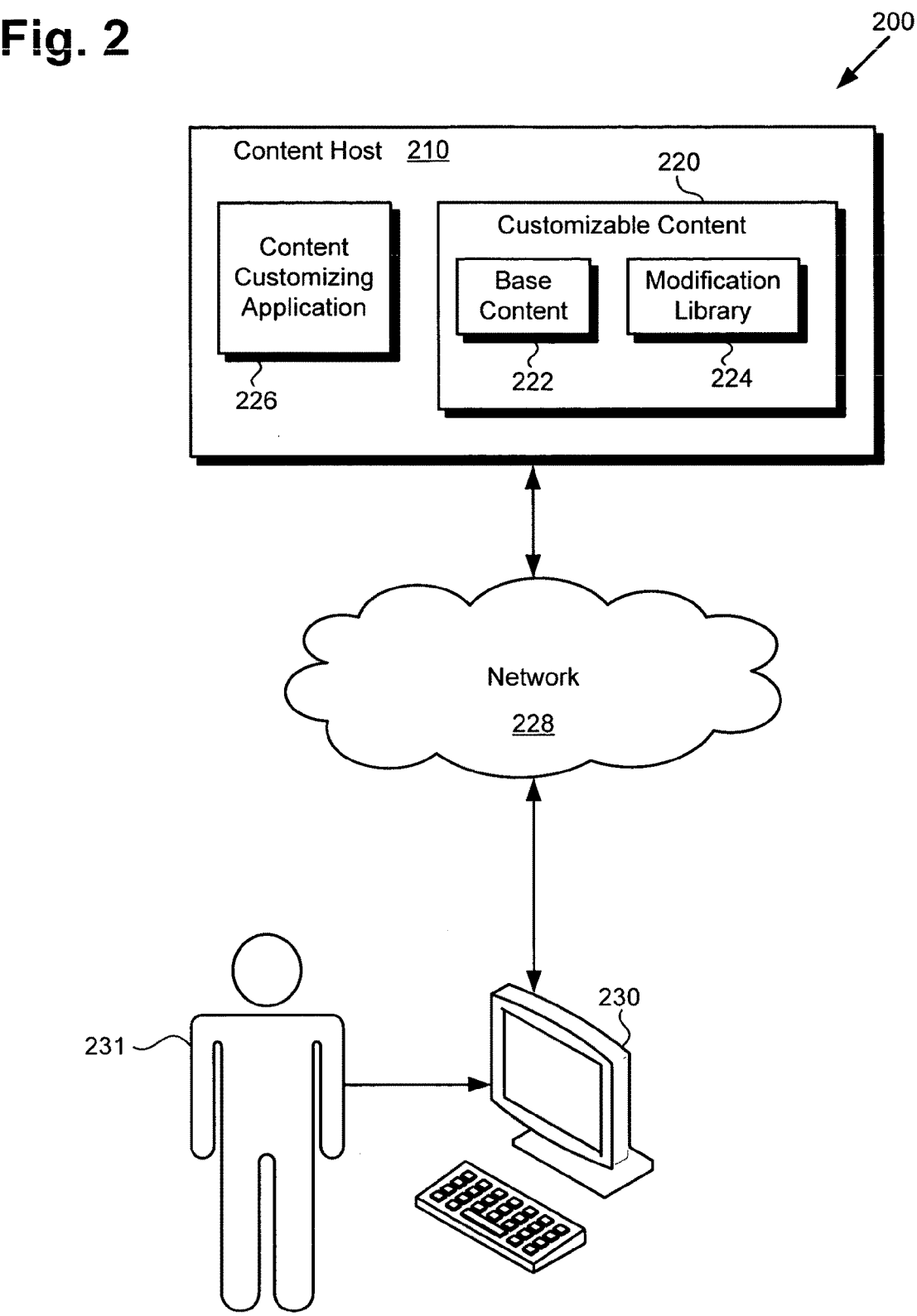
FIG. 2 shows a diagram of an exemplary system for producing customized content, according to one embodiment of the present invention.

FIG. 2 shows a diagram of an exemplary system for producing customized content, according to one embodiment of the present invention corresponding to a specific distribution path shown in FIG. 1. In the embodiment of FIG. 2, system 200 comprises content customizing application 226, and customizable content 220 including base content 222 and modification library 224, residing on content host 210. Also shown in FIG. 2 are network 228, content client 230, and consumer 231. Content host 210, customizable content 220 including base content 222 and modification library 224, content client 230, and consumer 231, in FIG. 2, correspond respectively to content host 110, customizable content 120 including base content 122 and modification library 124, content client 130a, and consumer 131, in FIG. 1. Moreover, network 228 in FIG. 2, which may be a packet network such as the Internet, for example, corresponds to worldwide content distribution hub 128, in FIG. 1. In addition, FIG. 2 includes content customizing application 226, which was alluded to in reference to FIG. 1, but not shown in that figure.

According to the embodiment of FIG. 2, consumer 231, acting as a customization administrator, may utilize content client 230 and network 228 to access content customizing application 226 on content host 210. Consumer 231 may then use content customizing application 226 to produce customized content from customizable content 220. Content customizing application 226 may be configured to extract content modifiers from modification library 224 and integrate those content modifiers with base content 222 according to customization rules coded into customizable content 220, to produce customized content for the enjoyment of consumer 231. Alternatively, as previously described, a producer, director, or distributor of customizable content 220, acting in the role of customization administrator, can customize base content 222 to produce customized content having customized presentation features including cultural, geographical, ethnic, architectural, iconographical, and physiological features, for example, familiar to a particular audience including consumer 231, making the content more desirable and/or engaging to that audience.

It is noted that although content client 230 is represented as a PC in FIG. 2, in other embodiments content client 230 may be another type of personal communication device or system such as a mobile telephone, a digital media player, personal digital assistant (PDA), a wireless computer, or a gaming console, for example. In still other embodiments, content client 230 may comprise a home entertainment system including a standard resolution or high-definition (HD) optical disc player such as a Blu-ray player, and/or a standard resolution or HD TV, for example, as well as content clients corresponding to elements 130b though 130f, in FIG. 1.

It is contemplated that all or part of the processes for producing customized content may be implemented utilizing local versions of content customizing application 226 in the content clients, rather than in a network connected service or content host. In digital cinema system 130b, shown in FIG. 1 for example, a digital cinema server 137, also acting as a content client, may run a content customization application to apply customizations for a particular theatre and/or a particular screen within a theatre multiplex. The content customization application may even be implemented within smart projector 138, functioning as a content client, such that customizations are actually made as the base content is projected. In home viewing cases the content customization application may be implemented in various devices such as satellite set-top box 130c, cable box 130d, digital recorder 130e (e.g., a DVR or PVR), or within a display device itself such as TV 130f having sufficient processing capability to implement the content customization application.

Alternatively, returning to FIG. 2, content customizing application 226 can be accessed through network 228. In that instance, content customizing application 226 may comprise a web application, accessible over a packet network such as the Internet. Alternatively, content customizing application 226 may reside on a server supporting a local area network (LAN), for instance, or included in another type of limited distribution network. In another embodiment, customizable content 220 including base content 222 and modification library 224 may be stored on a standard resolution or HD optical disc such as a digital video disc (DVD) or Blu-ray disc, for example.

Figure 3:
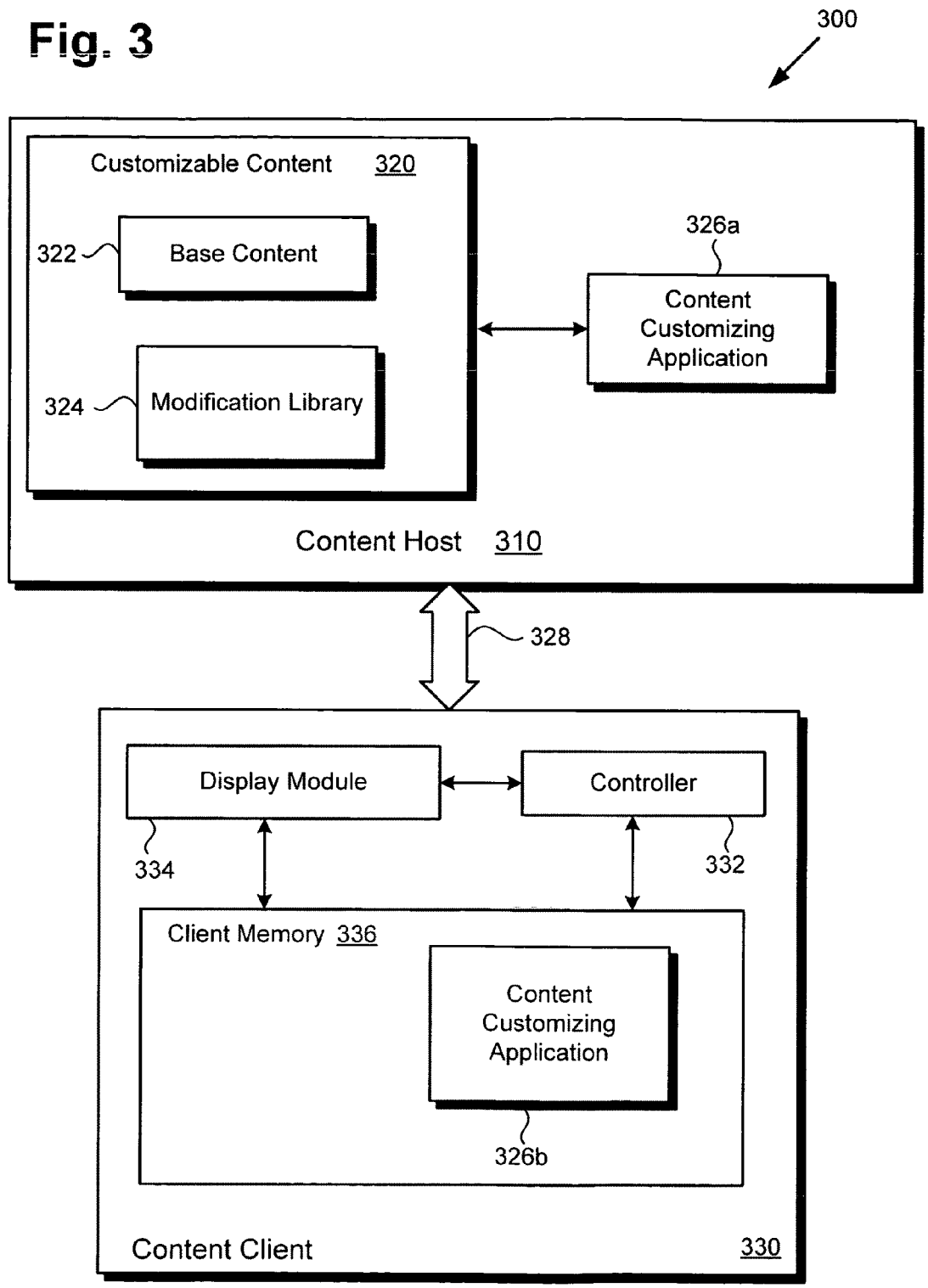
FIG. 3 shows a more detailed exemplary embodiment of a system for producing customized content, according to one embodiment of the present invention.

Turning now to FIG. 3, FIG. 3 provides a more detailed embodiment showing system 300 for producing customized content, according to one embodiment of the present invention. System 300, in FIG. 3, includes content client 330 receiving a data transfer via communication link 328 from content host 310. As may be seen from FIG. 3, content host 310 includes content customizing application 326a, and customizable content 320, which includes base content 322, and modification library 324. Content client 330 corresponds to content client 230, in FIG. 2. As shown in FIG. 3, content client 330 comprises controller 332, display module 334, and client memory 336.

Content host 310, content customizing application 326a, and customizable content 320 including base content 322 and modification library 324, in FIG. 3, correspond respectively to content host 210 content customizing application 226, and customizable content 220 including base content 222 and modification library 224, in FIG. 2. Although, as in FIG. 2, the embodiment of FIG. 3 shows content customizing application 326a residing apart from customizable content 320, that representation is exemplary only, and in another embodiment, content customizing application 326a may be included in customizable content 320. Also shown in FIG. 3 is content customizing application 326b, on content client 330.

In the present embodiment, content customizing application 326b is located in client memory 336, having been received from content host 310 via communication link 328 corresponding to network 228, in FIG. 2. As in FIG. 2, communication link 328 may represent download of content customizing application 326a over a packet network, for example. Once transferred, content customizing application 326b may be stored in client memory 336 and run locally on content client 330, as a desktop or other client-side application, for example. It is noted that communication link 328 is shown as a two-way communication, to correspond to possible ongoing communication between content client 330 and content host 310.

Alternatively, content customizing application 326a can reside on a computer-readable medium compatible with content client 330. For example, instructions comprising content customizing application 326a which, when executed by content client 330, perform a method for producing customized content may reside on the computer-readable medium. The method performed in response to the computer-readable medium stored instructions may include identifying customizable content from which to produce the customized content, identifying base content in the customizable content, receiving customizing criteria as input, determining content modifiers for harmonizing the base content and the customizing criteria, extracting the content modifiers from a modification library, and integrating the content modifiers with the base content to produce the customized content.

In one embodiment, the method performed in response to the computer-readable medium stored instructions may further comprise evaluating default presentation features of the base content for consistency with the customizing criteria. In some embodiments, the computer-readable medium on which reside the instructions comprising content customizing application 326b, may also have stored thereon the base content and the modification library used to produce the customized content.

The expression "computer-readable medium," as used in the present application, refers to any medium that provides instructions to controller 332 of content client 330. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

Controller 332 may be the central processing unit for content client 330, for example, in which role controller 332 runs the client operating system, manages display module 334, and facilitates execution of content customizing application 326b. Display module 334, under the control of controller 332, may provide playback of the customized content produced by content customizing application 326a or 326b, to enable a consumer audience to enjoy culturally and/or regionally relevant customized content.

Figure 4:
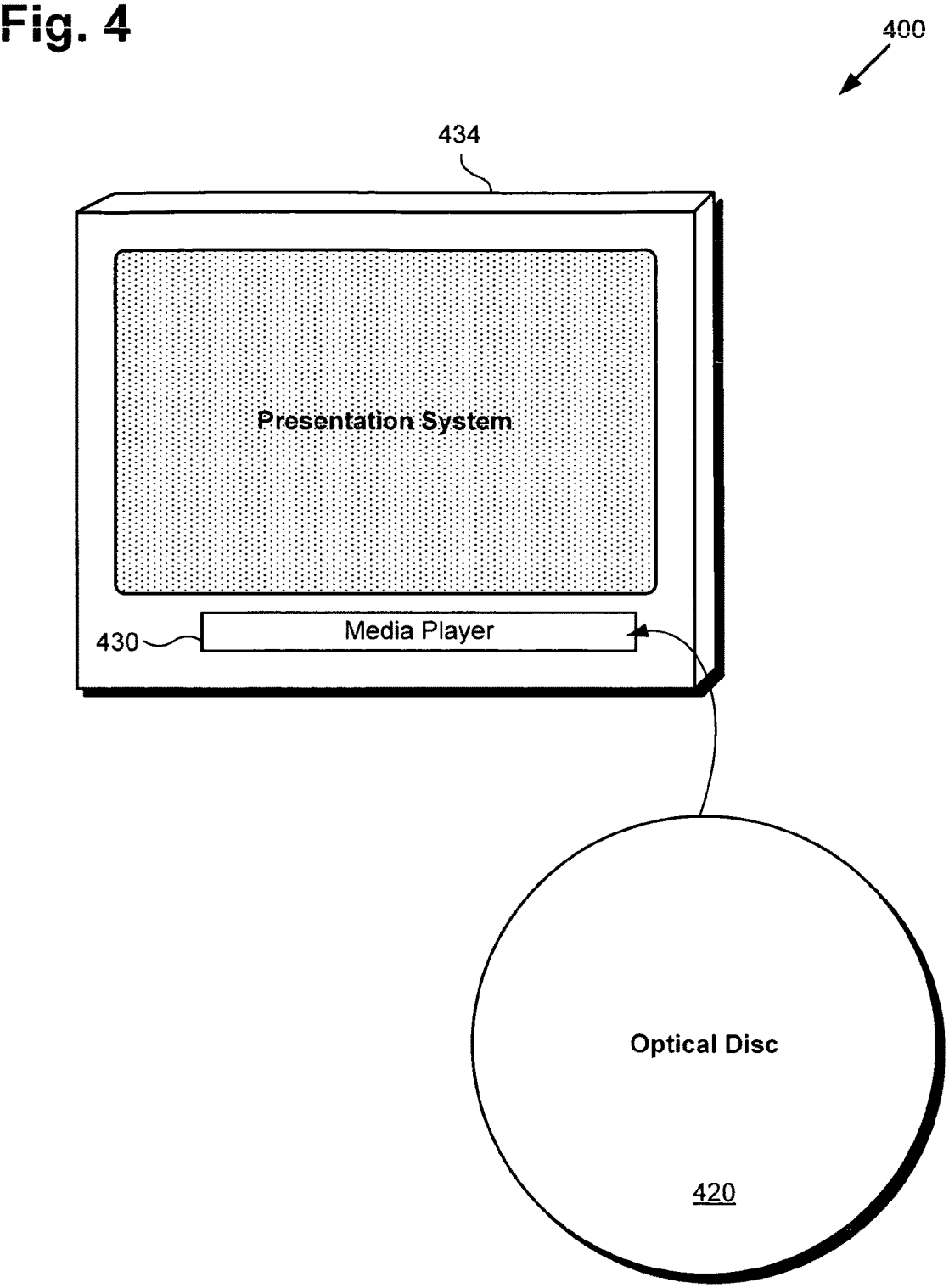
FIG. 4 shows a diagram of an exemplary system for producing customized content utilizing a computer-readable medium, according to one embodiment of the present invention.

Turning now to FIG. 4, FIG. 4 shows a diagram of an exemplary system for producing customized content utilizing a computer-readable medium, according to one embodiment of the present invention. FIG. 4 shows system 400 comprising a portable computer-readable medium in the form of optical disc 420, and presentation system 434 including media player 430. Optical disc 420, which may correspond to customizable content 320, in FIG. 3, may be a Blu-ray disc or other HD or standard density storage disc, for example, containing base content and a modification library. In addition, optical disc 420 may store instructions comprising a content customizing application, corresponding to content customizing application 326a, in FIG. 3, which, when executed by presentation system 434, produce customized content from the base content using customization rules coded into the customizable content, and content modifiers extracted from the modification library. According to the embodiment of FIG. 4, a consumer controlling presentation system 434 may assume the role of customization administrator and utilize media player 430 and presentation system 434 to produce and enjoy content customized so as to be relevant to their individual life experience.

Figure 5:
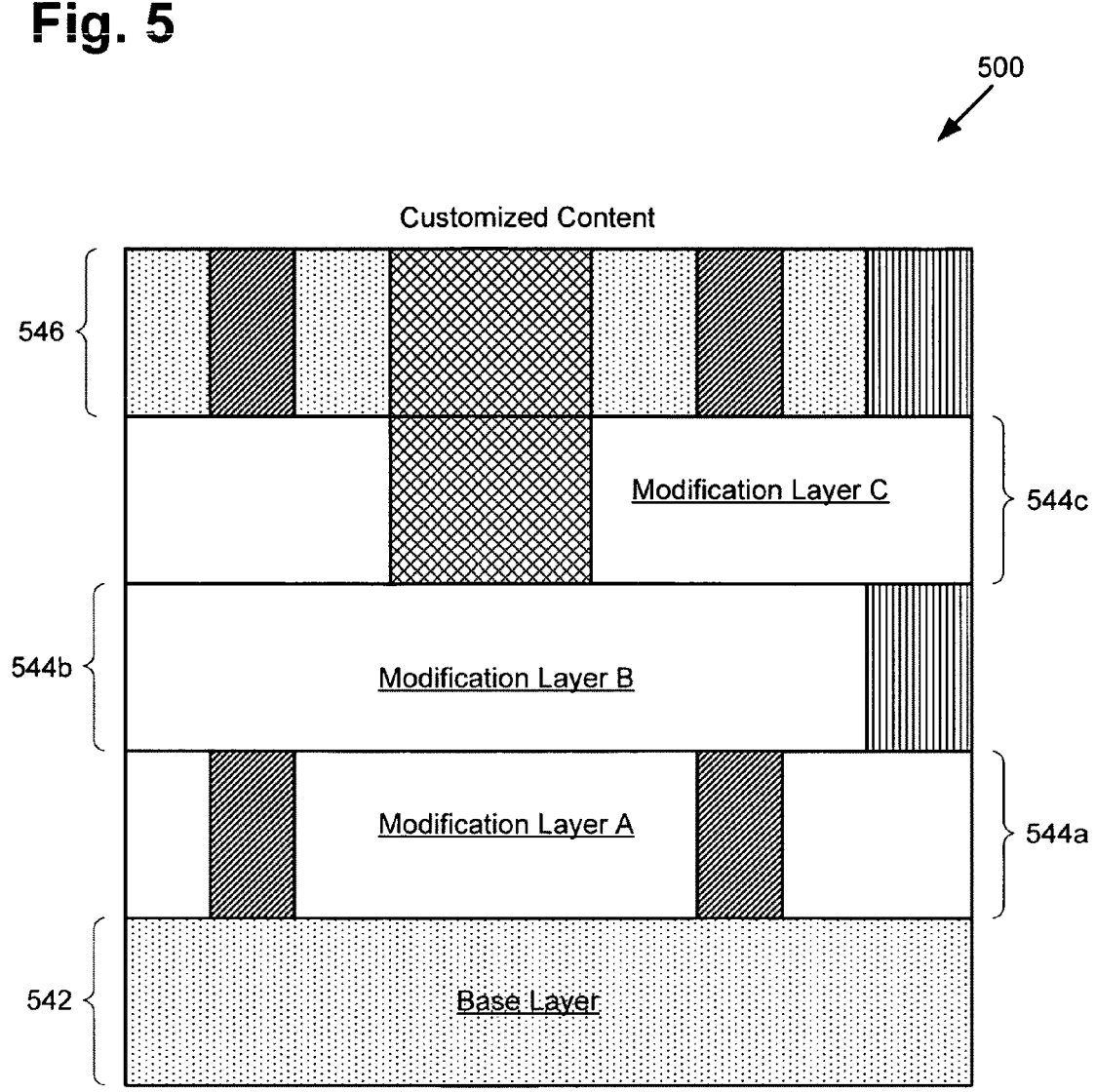
FIG. 5 shows a diagram representing production of customized content from a combination of base content and a plurality of modification layers, according to one embodiment of the present invention.
Figure 6:
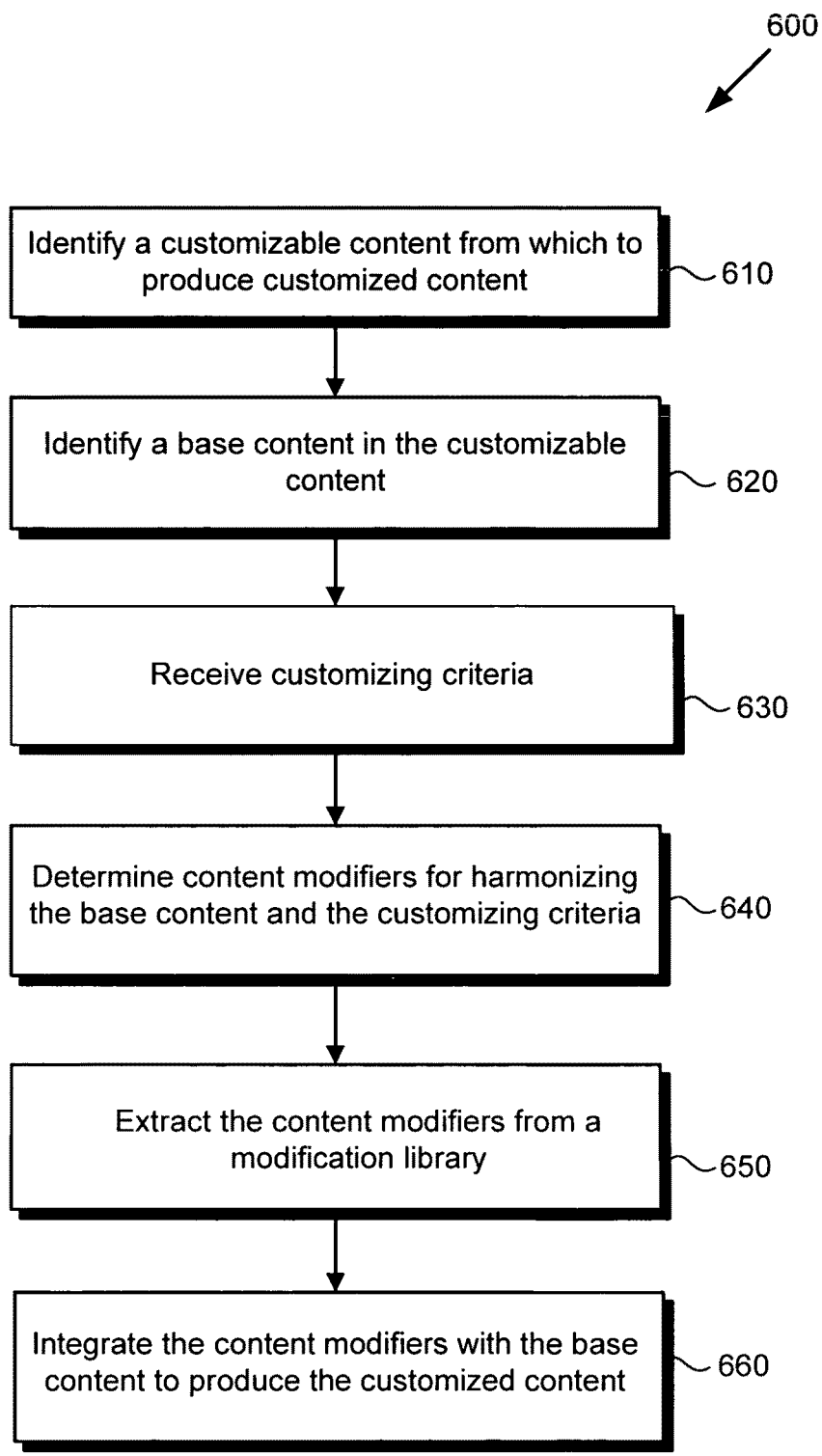
FIG. 6 is a flowchart presenting a method for producing customized content, according to one embodiment of the present invention.

The present invention will now be further described by reference to FIG. 5 and FIG. 6. FIG. 5 shows a diagram representing production of customized content from integration of base layer 542 and plurality of modification layers 544a, 544b, and 544c, to produce customized content 546, according to one embodiment of the present invention. FIG. 6 presents flowchart 600 describing an exemplary method of producing customized content, according to one embodiment of the present invention. Certain details and features have been left out of flowchart 600 that are apparent to a person of ordinary skill in the art. For example, a step may consist of one or more substeps or may involve specialized equipment or materials, as known in the art. While steps 610 through 660 in FIG. 6 are sufficient to describe a particular embodiment of the present method, other embodiments may utilize steps different from those shown in flowchart 600, or may include more, or fewer steps.

Step 610 of flowchart 600 comprises identifying a customizable content from which to produce the customized content. Referring to FIG. 3, step 610 may correspond to identification of customizable content 320 by content customizing application 326a or 326b. In one embodiment, identification of customizable content 320 may comprise distinguishing between content which is customizable, such as a customizable feature film provided according to an embodiment of the present invention, and content which is not, such as a conventional feature film. In some embodiments, identification of customizable content 320, in step 610, includes recognition of the default format of the customizable content, and/or customization rules coded into customizable content 320, and/or the content modifiers available in modification library 324 for producing customized content.

The exemplary method of flowchart 600 continues with step 620, which comprises identifying a base content in the customizable content. Step 620 may be performed by content customizing application 326a or 326b, for example. Referring to FIG. 5, FIG. 5 provides a conceptual example showing a layered approach to production of customized content. Step 620 of flowchart 600 may correspond to use of base content as base layer 542, upon which plurality of modification layers 544a, 544b, and 544c may be overlaid to produce customized content 546.

As previously explained, the base content providing base layer 542 may be selected from a wide variety of entertainment or information content, such as electronic books, instructional materials, film, TV, video games, music videos, and advertisements, for example. Moreover, in some embodiments base layer 542 can correspond to a base content provided in a default format or version, that is a self contained, presentation-ready, content capable of playback without addition of modification layers 544*a*, 544*b*, and/or 544*c*. In those embodiments, base layer 542 provides base content that may be selected and enjoyed as is, while also enabling production of customized content from that base content.

Flowchart 600 continues with step 630, comprising receiving at least one customizing criterion as an input. Turning to FIG. 2 for a moment, in one embodiment step 630 may correspond to content customizing application 226 receiving data identifying a geographical location of content client 230, from content client 230 or network 228, for example, wherein that location information comprises a customizing criterion. In some embodiments, one or more customizing criteria may be received by content customizing application 226 so as to be transparent to consumer 231. In those embodiments, production of customized content may be an automated or semi-automated process, performed largely independently of the producer, distributor, or consumer. In other embodiments, however, a customization administrator such as a producer, director, distributor, or consumer 231, for example, may actively participate in producing the customized content by providing customization administrator selected customizing criteria, which may be received and implemented by content customizing application 226.

In general, customizing criteria may comprise as large a set of parameters as required to span the spectrum of distinctive human cultures and ethnicities. In practice, customizing rules defining allowable customizing criteria may be predetermined and coded into customizable content 220. Alternatively, determination of what comprises allowable customizing criteria may be a dynamic process taking into consideration factors such as the nature of customizable content 220, whether the content is provided directly by content host 210 or accessed from a portable computer-readable medium, such as optical disc 420, in FIG. 4, and/or audience associated factors such as the age, gender, ethnicity, culture and/or expressed presentation preferences of the target audience, for example.

Continuing with step 640 of flowchart 600, step 640 comprises determining a plurality of content modifiers for harmonizing the base content and the at least one customizing criterion. Determination of the content modifiers for use in producing the customized content may be performed by content customizing application 326*a* or 326*b*, by reference to customization rules coded in customizable content 320, and content modifiers available in modification library 324. In one embodiment, as shown by FIG. 5, content modifiers may take the form of modification layers 544*a*, 544*b*, and 544*c*, which may overlay base layer 542 to produce customized content 546. For example, modification layer 544*a* may include content modifiers overlaying and altering architectural features of base layer 542. In a similar manner, modification layer 544*b* may alter the attire of characters appearing in base layer 542, while modification layer 544*c* may modify their physical features.

For example, as previously described in conjunction with system 200, in FIG. 2, in one embodiment, content modifiers may be determined to produce customized content having customized presentation features corresponding to a geographical region associated with or selected by the customization administrator of the customized content, who, as previously explained, may be the customizable content producer, or a distributor, or consumer of the content, for instance. In that embodiment, as well as others, integrating the content modifiers with the base content may result in altering the physical appearance of human-like figures included in the base content, for example by changing the eye, hair, and/or skin color of images of human characters included in the content.

Although the embodiment of FIG. 5 shows base layer 542 overlaid by three modification layers, in other embodiments, base content may be overlaid by fewer, or even many more modification layers. It is noted that the present representation of content modifiers as being provided in modification layers is merely an example used for its utility as a conceptual aid. More generally, the content modifiers determined by the content customizing application need not be implemented as layers. The content modifiers determined in step 640 may then be extracted from modification library 324 by content customizing application 326*a* or 326*b* in step 650, to be used with base content 322 for production of the customized content.

Moving now to step 660 of flowchart 600, step 660 comprises integrating the content modifiers determined in step 640 with the base content to produce the customized content. As the result of steps 610 through 660 in flowchart 600, an audience may be provided with customized content having customized presentation features including cultural, geographical, architectural, physiological features, to name a few, familiar to the members of the audience. Consequently, the audience members may be presented with customized content enabling them to more closely relate to and connect with the content, thus rendering the content more desirable to them.

Although not included in flowchart 600, in some embodiments a method for producing customized content may include evaluating default presentation features of the base content for consistency with the at least one customizing criterion received in step 630. This evaluation may be performed by content customizing application 326*a* or 326*b*, shown in FIG. 3. In some situations, the default presentation features of the base content may substantially match the customizing criteria. Returning to the example introduced in the discussion surrounding FIG. 2, for example, substantial agreement might be found where the feature film content produced for a default Midwestern United States audience is accessed by or presented to an audience in Ohio, for example. Where, as in the earlier example however, the audience is in India, there may be significant areas of disagreement between customizing criteria associated with that geographic region and the default presentation features of the base content.

As described by flowchart 600 of FIG. 6, the present method describes an approach to producing customized content, but does not specify the origin of the customizable content including the base content utilized to produce the customized content. In some embodiments, a method for producing customized content includes the step of providing the customizable content including the base content, for example, on an optical disc accompanied by a content customizing application, as described in reference to FIGS. 3 and 4. Furthermore, in some embodiments, a method for producing customized content may include creating the base content included in the customizable content.

Figure 7A:
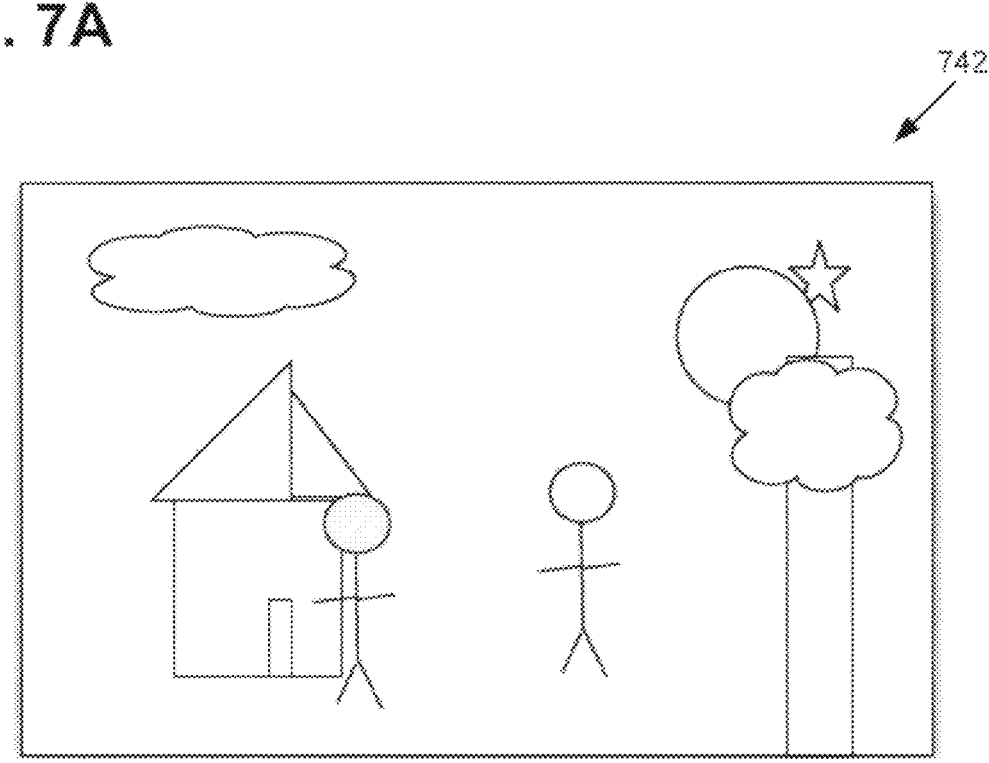
FIG. 7A shows a visual frame of an exemplary base content corresponding to base layer 542 in FIG. 5, according to one embodiment of the present invention.
Figure 7B:
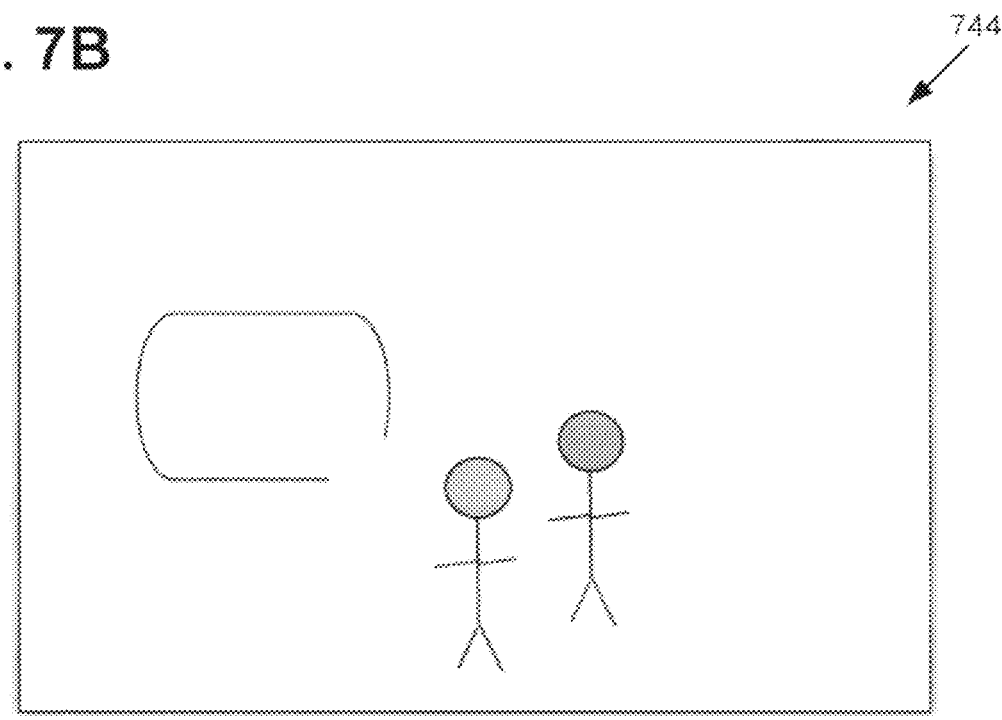
FIG. 7B shows a visual frame of an exemplary content modifier corresponding to any of modification layers 544a, 544b, or 544c in FIG. 5, according to one embodiment of the present invention.
Figure 7C:
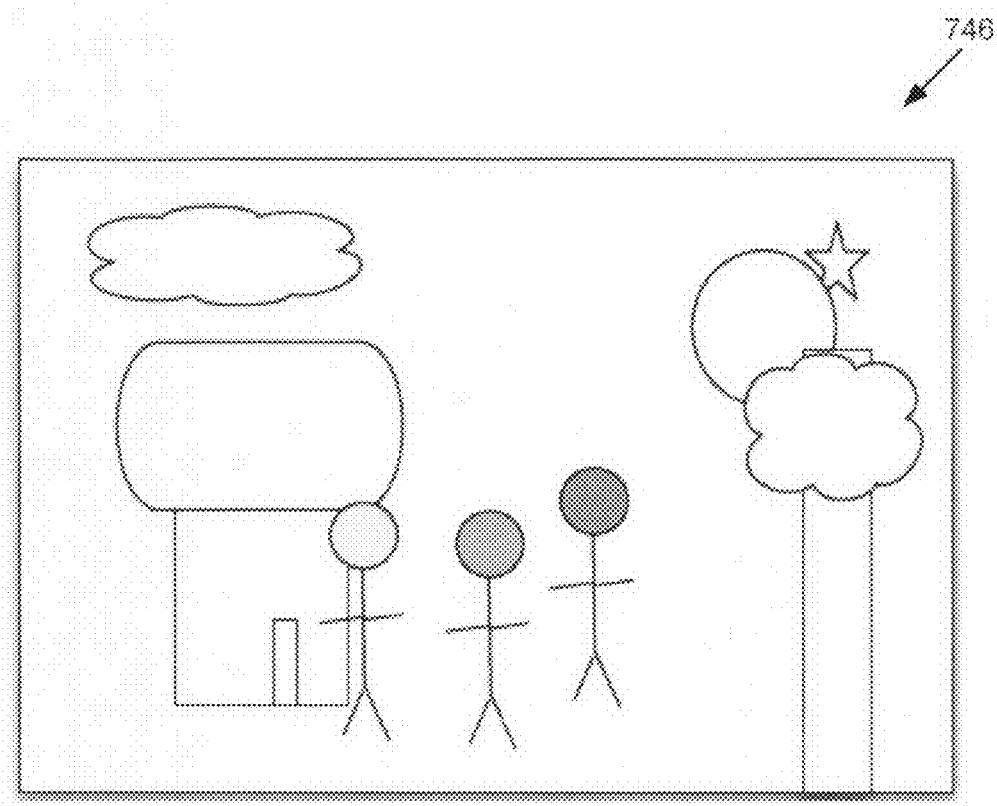
FIG. 7C shows a visual frame of an exemplary customized content corresponding to layer 546 in FIG. 5, according to one embodiment of the present invention.

Turning now to FIGS. 7A, 7B, and 7C, let us once again conceptualize content modifiers as being provided by modification layers, as shown in FIG. 5. FIG. 7A shows visual frame 742 of an exemplary base content corresponding to base layer 542 in FIG. 5, while FIG. 7B shows visual frame 744 of an exemplary content modifier corresponding to any of modification layers 544*a*, 544*b*, or 544*c* in FIG. 5. FIG. 7C shows visual frame 746 of an exemplary customized content corresponding to customized content 546 in FIG. 5.

As may be seen from FIGS. 7A, 7B, and 7C, the merging of visual frames 742 and 744, corresponding to integration of base layer 542 and modification layers 544a, 544b, or 544c, in FIG. 5, produces visual frame 746 which alters some of the features of the base content to harmonize them with features consistent with the cultural, and/or regional, and or ethnic identification specified by a customization administrator, such as a producer, distributor, or consumer of the content, for example. As a result, a customized content is produced having a look and feel with which the audience for the content may more closely relate.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for producing a customized content from a customizable content, the method comprising:
    identifying the customizable content;
    identifying a base content in the customizable content;
    receiving at least one customizing criterion as input;
    determining a plurality of content modifiers for harmonizing the base content and the at least one customizing criterion;
    extracting the plurality of content modifiers from a modification library; and
    integrating the plurality of content modifiers with the base content to produce the customized content having customized presentation features corresponding to an ethnicity of a target audience selected by a customization administrator of the customized content, wherein the selection of the ethnicity of the target audience by the customization administrator alters, according to the ethnicity of the target audience, one or more features included in the base content, wherein the one or more features include a physical appearance of at least one architectural feature in the base content.

2. The method of claim 1, further comprising evaluating default presentation features of the base content for consistency with the at least one customizing criterion.

3. The method of claim 1, further comprising providing the customizable content including the base content.

4. The method of claim 1, further comprising creating the base content.

5. The method of claim 1, wherein the base content is a presentation-ready content capable of playback without customization.

6. The method of claim 1, wherein the base content is selected from a variety of entertainment content including film, television, video games, music videos, and advertisements.

7. The method of claim 1, wherein the plurality of content modifiers is determined to produce the customized content having customized presentation features further corresponding to a geographical region selected by the customization administrator of the customized content.

8. The method of claim 7, wherein the customization administrator is one of the group consisting of a customizable content producer, director, distributor, and consumer.

9. The method of claim 1, wherein the one or more features include a physical appearance of at least one human-like figure and an audio feature in the base content, wherein the selection of the ethnicity of the target audience by the customization administrator further alters, according to the ethnicity of the target audience, the physical appearance of at least one human-like figure and the audio feature in the base content, and wherein the physical appearance of the at least one human-like figure included in the base content that is altered according to the ethnicity of the target audience is one of eye, hair and skin color.

10. A computer-readable storage medium having stored thereon instructions comprising a content customizing application which are executed by a controller to perform a method comprising:
    identifying a customizable content from which to produce the customized content;
    identifying a base content in the customizable content;
    receiving at least one customizing criterion as input;
    determining a plurality of content modifiers for harmonizing the base content and the at least one customizing criterion;
    extracting the plurality of content modifiers from a modification library; and
    integrating the plurality of content modifiers with the base content to produce the customized content having customized presentation features corresponding to an ethnicity of a target audience selected by a customization administrator of the customized content, wherein the selection of the ethnicity of the target audience by the customization administrator alters, according to the ethnicity of the target audience, one or more features included in the base content, wherein the one or more features include a physical appearance of at least one architectural feature in the base content.

11. The computer-readable storage medium of claim 10, further having stored thereon the base content and the modification library.

12. The computer-readable storage medium of claim 10, wherein the computer readable medium comprises a Blu-ray disc.

13. The computer-readable storage medium of claim 10, wherein the base content is a presentation-ready content capable of playback without customization.

14. The computer-readable storage medium of claim 10, wherein the base content is selected from a variety of entertainment content including film, television, video games, music videos, and advertisements.

15. The computer-readable storage medium of claim 10, wherein the plurality of content modifiers is determined to produce the customized content having customized presentation features further corresponding to a geographical region selected by the customization administrator of the customized content.

16. The computer-readable storage medium of claim 10, wherein the customization administrator is one of the group consisting of a customizable content producer, director, distributor, and consumer.

17. A system for producing customized content, the system comprising:
    a controller;
    a content host hosting a customizable content;
    a base content included in the customizable content, the base content created for use in producing the customized content;

a modification library stored with the customizable content, the modification library including content modifiers for use with the base content; and a content customizing application for execution by the controller from a computer-readable storage medium to enable integration of a determined plurality of content modifiers extracted from the modification library with the base content produce the customized content from the base content and the determined plurality of content modifiers;

the customized content having customized presentation features corresponding to an ethnicity of a target audience selected by a customization administrator of the customized content, wherein the selection of the ethnicity of the target audience by the customization administrator alters, according to the ethnicity of the target audience, one or more features included in the base content, wherein the one or more features include a physical appearance of at least one architectural feature in the base content.

18. The system of claim 17, further comprising a content client configured to communicate with the content host over a network.

19. The system of claim 18, wherein the content client comprises a home entertainment system selected from the group consisting of a personal computer (PC), a Blu-ray player, and a high-definition television (HD TV).

20. The system of claim 18, wherein the content client comprises a personal communication device selected from the group consisting of a mobile telephone, a digital media player, personal digital assistant (PDA), a portable computer, and a gaming console.

21. The system of claim 17, wherein the system is configured to produce the customized content having customized presentation features further corresponding to a geographical region selected by the customization administrator of the customized content.

22. The system of claim 21, wherein the customization administrator is one of the group consisting of a customizable content producer, director, distributor, and consumer.

23. The system of claim 17, the one or more features include a physical appearance of at least one human-like figure and an audio feature in the base content, wherein the selection of the ethnicity of the target audience by the customization administrator further alters, according to the ethnicity of the target audience, the physical appearance of at least one human-like figure and the audio feature in the base content, and wherein the physical appearance of the at least one human-like figure included in the base content that is altered according to the ethnicity of the target audience is one of eye, hair and skin color of the at least one human-like figure.

* * * * *